Patented June 17, 1952

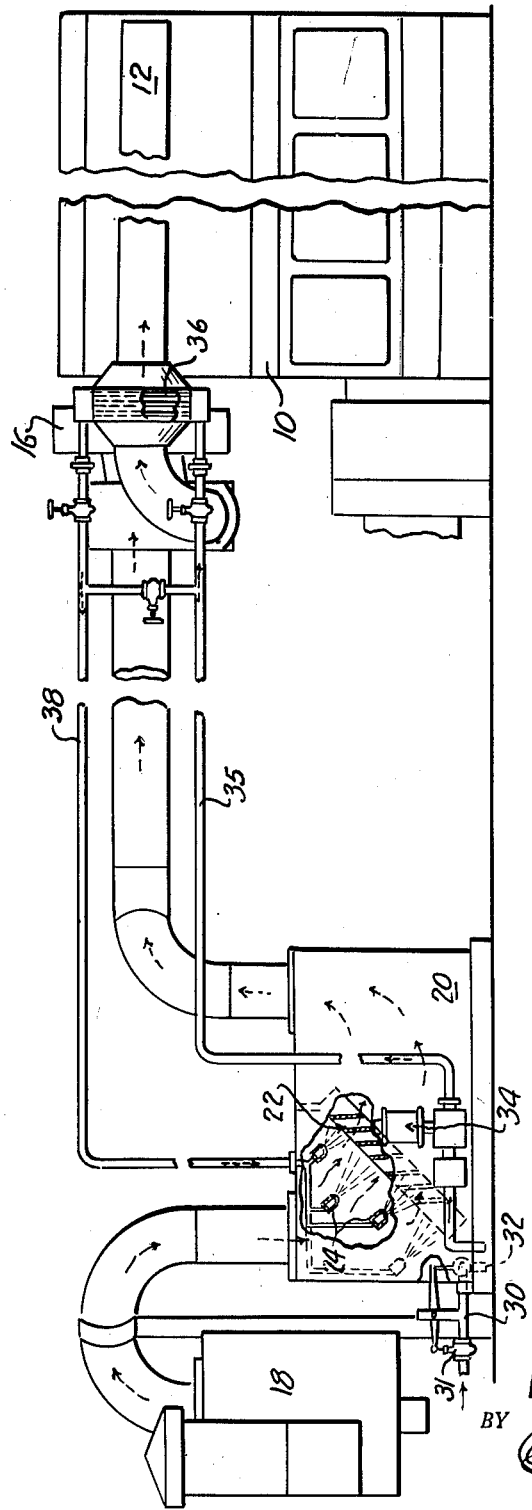

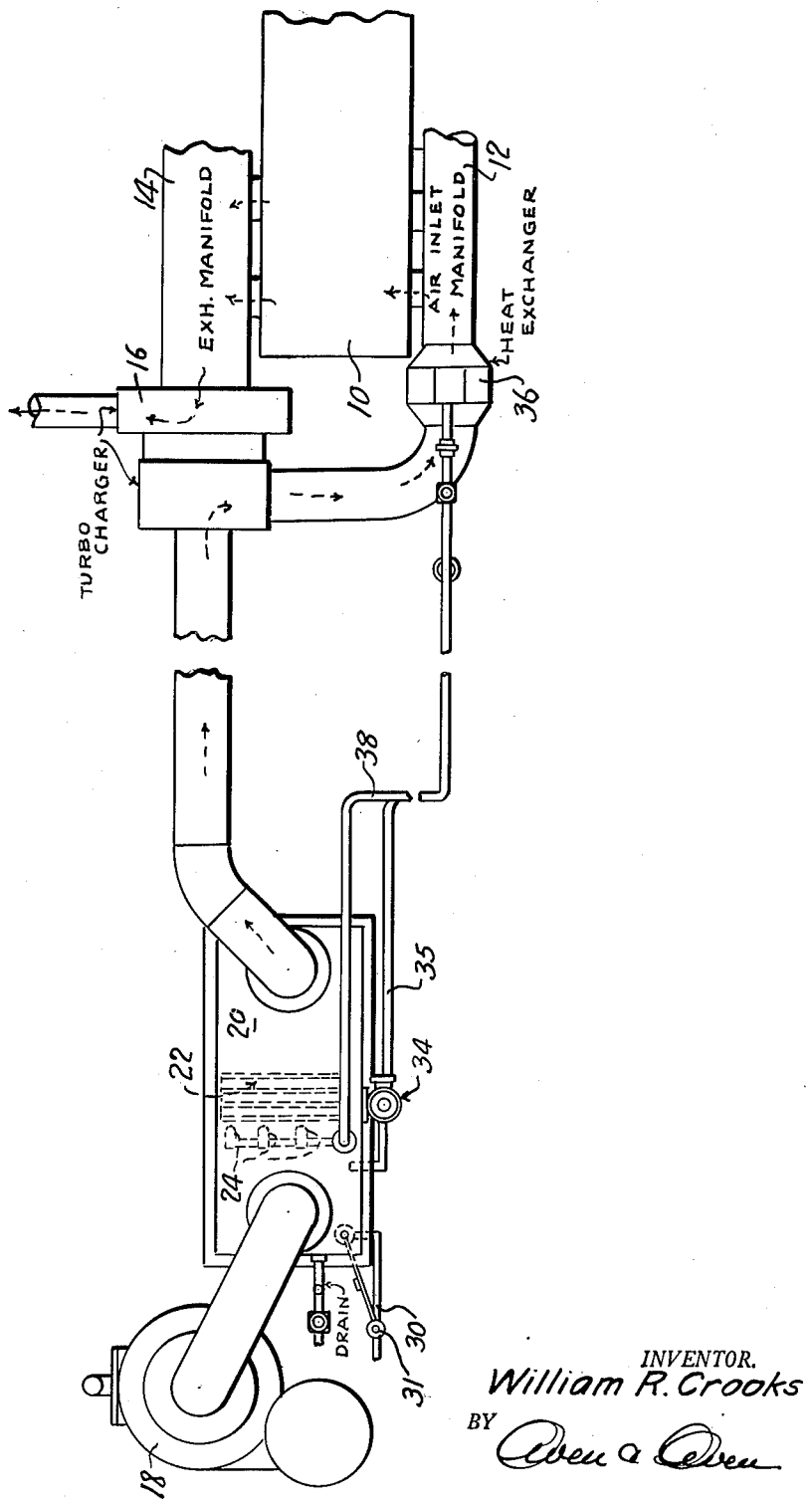

2,600,736

UNITED STATES PATENT OFFICE 2,600,736

METHOD AND APPARATUS FOR COOLING THE AIR SUPPLIED TO INTERNAL-COMBUSTION ENGINES

William R. Crooks, Grove City, Pa., assignor to The Cooper-Bessemer Corporation, Mount Vernon, Ohio, a corporation of Ohio Application June 15, 1951, Serial No. 231,864

3 Claims. (Cl. 123—119)

This invention relates to an improvement in internal combustion engines operating either with oil or gas as fuel. The invention is particularly directed to a method and apparatus for cooling the air supplied to the engine cylinders.

In the operation of gas or diesel engines in certain climates where high ambient air temperatures are encountered, it has been found very desirable to cool the air supplied to the engine. Cooling the air results in lower fuel consumption in the higher output ranges, as well as lower individual cylinder temperatures and lower exhaust temperatures which contribute to longer life and reduced maintenance costs for the engine. Air cooling is of especial significance where the engine is equipped with an exhaust gas driven supercharger since the air supplied to the cylinders of such an engine is raised materially in temperature, as much as 75 degrees, by the energy imparted to it by the compressor. It has been the practice to use an intercooler between the supercharger output and the engine intake manifold to lower the temperature somewhat prior to its entry into the manifold. The present invention provides a heat exchanger in the system at this point, but the supply of cooling water to the device is arranged in a novel manner.

The primary object of the present invention is to provide a simple and efficient method and apparatus to cool the air supplied to the cylinders of an internal combustion engine.

Another object of the invention is to provide a method of cooling the air for a supercharged internal combustion engine in two stages, one before and one after the supercharger, the heat being extracted from the coolant for the second stage simultaneously with the reduction in temperature in the first stage.

Other objects and advantages of the invention will become apparent from the following description of a preferred embodiment, taken in connection with the accompanying drawings, in which:

Fig. 1 is a side elevational, diagrammatic view of an engine installation incorporating the present invention; and Fig. 2 is a plan view thereof.

Referring to the drawings which illustrate diagrammatically one embodiment of the present invention, the engine to which the invention is applied is indicated at 10. The engine has an intake manifold 12 and an exhaust manifold 14, which latter supplies energy for the operation of a turbocharger 16.

Air for the induction system of the engine is taken through a conventional filter 18 to an evaporating chamber 20 and thence to the turbocharger and manifold. The evaporating chamber 20 may be of any suitable construction, but is preferably provided with a series of baffles 22 over which water is sprayed from a plurality of nozzles 24. The baffles serve to increase greatly the area of contact between the air flowing through the chamber and the water, thus greatly increasing the quantity of water evaporated in a given space and time.

Water is supplied initially to the system from an inlet 30 which empties into the sump 32 of the evaporator, the supply being determined by a float controlled valve diagrammatically shown at 31. A pump 34 is provided which has its intake connected to the sump 32 and its discharge connected by a pipe 35 to an aftercooler 36 disposed in heat exchange relationship with the air discharged from the turbocharger 16 and passing to the intake manifold 12. The water flowing from the aftercooler or heat exchanger 36 passes through pipe 38 to the nozzles 24 where it is sprayed, under the discharge pressure of pump 34, into the evaporator chamber over the baffles.

It will be seen that the water supplied to the system through valve 31 is equal only to that quantity which is lost by evaporation to the air passing in the system.

The operation of the present invention can best be understood by following the calculations of a specific installation. This installation was made in Arizona where high air temperatures and low relative humidities are encountered frequently.

The specific heat of air is about .24, and the latent heat of vaporation is about 1000 B. t. u. per pound. A supercharged engine requires approximately 10 lbs. of combustion air per horsepower hour.

Assuming an ambient air temperature of 110° F., the relative humidity of the air being such that the wet bulb temperature is 80° F., the heat removable from the air and water in an evaporative cooler is 110°—80°×.24×10 lbs.=72 B. t. u. per horsepower hour. This requires the evaporation of $$\frac{72 \text{ B.t.u.}}{1000 \text{ B.t.u./lb.}}$$

or .072 lb. of water per h.p. hour.

Heat is added to the air from the evaporative cooler by the compression and friction in the charging blower section of the turbocharger.

This heat raises the air temperature by, for example, 75° F. Since air enters the supercharger at 80° F., it will be discharged therefrom at 155° F., which is undesirably hot.

The heat exchanger or aftercooler 36 is supplied with water at 80° F. from the sump of the evaporator. Good practice has shown that the air passing through the aftercooler 36 can be cooled to within 15° to 25° of the coolant temperature. Thus the air entering the aftercooler at 155° can be discharged therefrom to the engine manifold at, for example 105°, a drop of 50° in temperature and requiring the removal of 50°×10 lbs.×.24=120 B. t. u. per H. P. hour. This requires the evaporation of .120 lb. of water.

The combined cooling stages require

.120+.072=.192 for each horsepower hour. For a 2000 H. P. engine, the weight of water required to be evaporated is thus about 384 lbs. per hour which is the equivalent of about 33 "tons" of refrigeration.

It will be seen that my method does not require large quantities of circulating water such as is commonly supplied to heat exchangers where the heat extracted is represented by the increase in temperature of the water which is then either discharged or passed to a cooling tower not otherwise related to the system. It is thus highly advantageous for those installations at which adequate water supply is a problem.

It has been found that cooling and humidifying the air in accordance with the present invention not only lowers the cylinder temperatures as would be expected, but results also in lowering materially the engine fuel consumption while increasing the load carrying ability of the unit. The lowered temperatures make possible a more dependable operation of the associated turbocharger since the exhaust gases supplied thereto are not overheated as is sometimes the case under high engine loads.

While the invention has been disclosed in conjunction with a specific, but diagrammatically disclosed apparatus, it should be expressly understood that numerous modifications and changes may be made without departing from the spirit and scope of the appended claims.

I claim:

1. A method of conditioning the air supplied to an internal combustion engine having an associated charging blower which comprises evaporating water into the engine air supply to reduce its temperature, then passing the air successively through the charging blower and a heat exchanger to the engine manifold, and circulating water through the heat exchanger and returning it as spray to the air stream prior to its entry into the blower, the rate of evaporation being in excess of that required to reduce the temperature of the air alone.

2. A method of conditioning the air supplied to an internal combustion engine having an associated charging blower which comprises, lowering the temperature of the air in an evaporator by the evaporation of water sprayed therethrough, passing the air successively through the charging blower and a heat exchanger to the engine manifold, and circulating water as coolant in the heat exchanger and as spray in the evaporator, the rate of evaporation being sufficient to dissipate the heat extracted by the water in the heat exchanger and to lower the temperature of the air passing to the charging blower.

3. Apparatus for conditioning and cooling the air supplied to an internal combustion engine having an associated charging blower which comprises, a chamber into which air is drawn by said blower, means to spray water into said chamber, a heat exchanger disposed between the discharge of said blower and the intake manifold of said engine, and means to circulate water from said chamber through said heat exchanger and back to said spraying means, the rate of evaporation of water in said chamber being sufficient to reduce the temperature of air passing therethrough and to dissipate the heat taken up by the water in said heat exchanger as heat of vaporization in the air passing through said chamber.

WILLIAM R. CROOKS.

No references cited.